US009952415B2

(12) United States Patent
Kao et al.

(10) Patent No.: US 9,952,415 B2
(45) Date of Patent: Apr. 24, 2018

(54) TRENCHED-SUBSTRATE BASED LENS MANUFACTURING METHODS, AND ASSOCIATED SYSTEMS

(71) Applicant: OmniVision Technologies, Inc., Santa Clara, CA (US)

(72) Inventors: Shao Fan Kao, Santa Clara, CA (US); Chia-Yang Chang, Sunnyvale, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 388 days.

(21) Appl. No.: 14/693,014

(22) Filed: Apr. 22, 2015

(65) Prior Publication Data

US 2016/0313540 A1 Oct. 27, 2016

(51) Int. Cl.
*G02B 13/00* (2006.01)
*B29D 11/00* (2006.01)
*G02B 3/00* (2006.01)

(52) U.S. Cl.
CPC .... *G02B 13/0085* (2013.01); *B29D 11/00307* (2013.01); *G02B 3/0031* (2013.01); *G02B 3/0062* (2013.01); *G02B 3/0068* (2013.01); *G02B 3/0075* (2013.01)

(58) Field of Classification Search
CPC .............. G02B 13/0085; G02B 3/0031; G02B 3/0062; G02B 3/0068; G02B 3/0075; B29D 11/00307
See application file for complete search history.

(56) References Cited

U.S. PATENT DOCUMENTS

| 2010/0027121 A1* | 2/2010 | Takahara | B29C 41/045 359/570 |
| 2011/0215342 A1* | 9/2011 | Oliver | B29C 43/18 257/81 |
| 2013/0122261 A1 | 5/2013 | Barnes et al. | |
| 2014/0016216 A1 | 1/2014 | Mori et al. | |
| 2014/0098433 A1 | 4/2014 | Hsiao et al. | |

FOREIGN PATENT DOCUMENTS

| JP | 2009147093 A | 7/2009 |
| JP | 2011059678 A | 3/2011 |
| TW | 201013245 A | 4/2010 |

OTHER PUBLICATIONS

Office Action corresponding to Taiwanese Patent Application No. 105111628, dated Aug. 21, 2017.

* cited by examiner

*Primary Examiner* — Mathieu Vargot
(74) *Attorney, Agent, or Firm* — Lathrop Gage LLP

(57) ABSTRACT

A trenched-substrate based lens manufacturing method includes depositing lens material on a first side of a substrate, wherein the first side of the substrate has a plurality of trenches. The method further includes shaping a plurality of lens elements from the lens material. The method includes shaping the plurality of lens elements, on a respective plurality of surface portions of the first side, by contacting a mold to the first side. Each of the surface portions are adjacent a respective one of the trenches. Additionally, the method includes accommodating an excess portion of the lens material in the trenches. A lens system, manufactured using this method, includes a substrate with a planar surface and a trench embedded in the planar surface. The lens system further includes a lens element molded on the planar surface adjacent to the trench.

20 Claims, 9 Drawing Sheets

600

MOLD A PLURALITY OF LENSES ON FIRST TRENCHED SIDE OF SUBSTRATE ACCORDING TO METHOD 300
610

MOLD A PLURALITY OF SECOND LENSES ON SECOND TRENCHED SIDE OF SUBSTRATE, FACING AWAY FROM FIRST TRENCHED SIDE, ACCORDING TO METHOD 300
620

TRENCHED-SUBSTRATE BASED LENS MANUFACTURING METHODS, AND ASSOCIATED SYSTEMS

BACKGROUND

Wafer-level methods are used to manufacture lenses at high volume and low cost. Wafer-level lenses are commonly used in consumer electronics devices such as camera phones and tablets. A conventional wafer-level lens is manufactured by molding lens elements onto a substrate, and subsequently dicing the substrate to singulate wafer-level lenses therefrom. The molding process consists of depositing a resin on the substrate and pressing a mold down on the substrate to shape a large number of lens elements on the substrate. With the mold in place on the substrate, the resin is cured to form the lens elements. The mold has recesses matching the desired lens shape. In addition, the mold has recesses adjacent to the lens locations for accommodating excess resin. These additional recesses are necessary to reliably produce the desired lens shapes. Due to the recesses, each lens element formed on the substrate is associated with an additional ring of resin on the substrate and surrounding the lens. This additional ring of resin is termed "yard". When dicing the substrate to singulate wafer-level lenses, dicing lines must be placed outside the yard, at a distance that further allows for placement of a mechanical fixture on the substrate outside the yard. As a result, each wafer-level lens includes both the lens element itself, the associated yard, and additional substrate material at larger radial distance from the lens elements than the yard.

SUMMARY

In an embodiment, a trenched-substrate based lens manufacturing method includes depositing lens material on a first side of a substrate, wherein the first side of the substrate has a plurality of trenches. The method further includes shaping a plurality of lens elements from the lens material. The method includes shaping the plurality of lens elements, on a respective plurality of surface portions of the first side, by contacting a mold to the first side. Each of the surface portions are adjacent a respective one of the trenches. Additionally, the method includes accommodating an excess portion of the lens material in the trenches.

In an embodiment, a lens system includes a substrate with a planar surface and a trench embedded in the planar surface. The lens system further includes a lens element molded on the planar surface adjacent to the trench.

DETAILED DESCRIPTION OF THE EMBODIMENTS

Disclosed herein are methods for manufacturing wafer-level lenses using a trenched substrate. These methods benefit from the trenched substrate to produce wafer-level lenses without yard. As a result, these methods may better utilize the area of the wafer and thus produce a higher yield per wafer than conventional wafer-level lens manufacturing methods. Also disclosed herein are lens systems produced using the trenched-substrate based methods.

Figure 1:
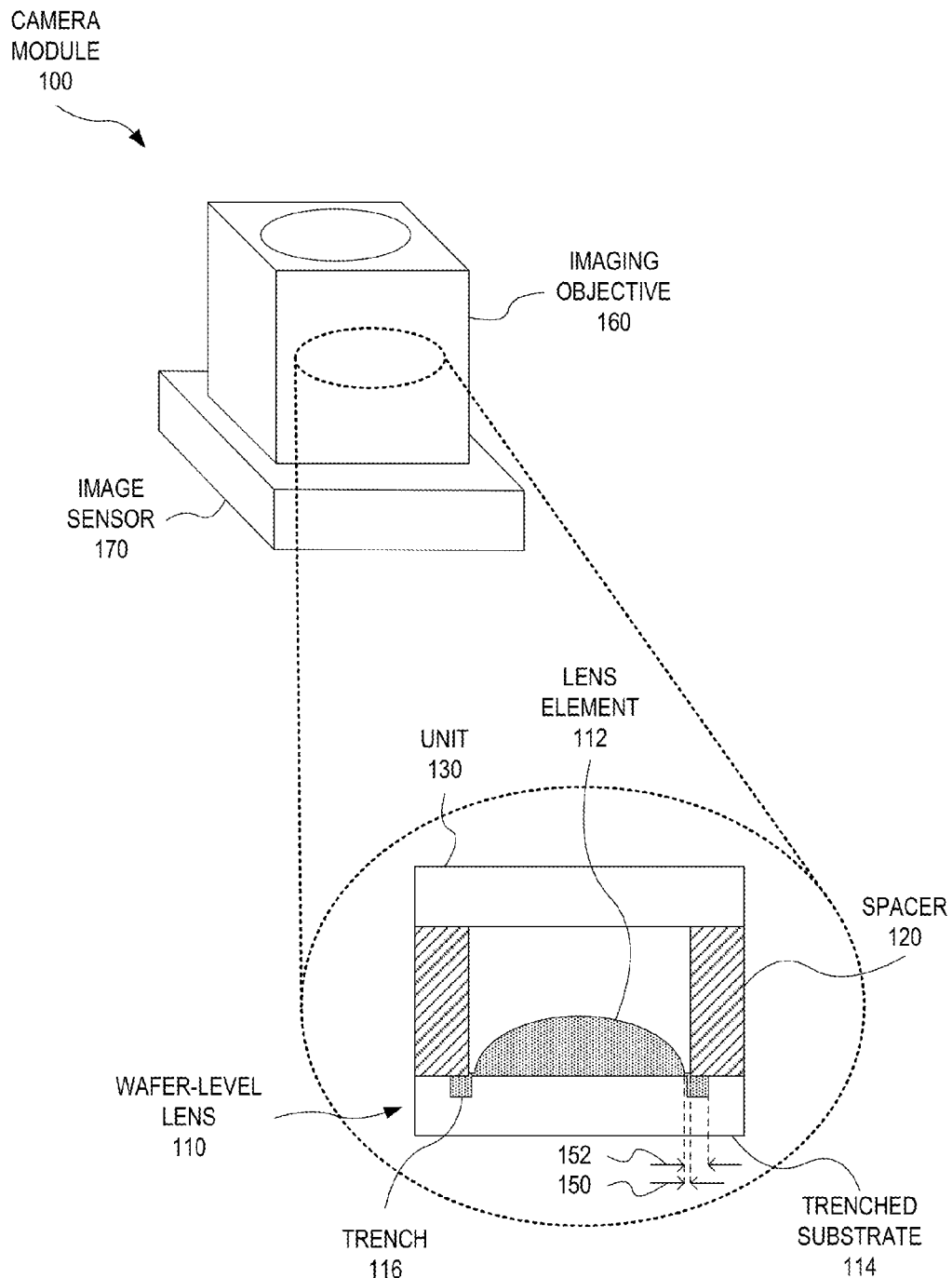
FIG. 1 illustrates a trenched-substrate based wafer-level lens implemented in a camera module, according to an embodiment.

FIG. 1 illustrates one exemplary trenched-substrate based wafer-level lens 110 implemented in one exemplary camera module 100. Camera module 100 includes an imaging objective 160 and an image sensor 170. Imaging objective 160 implements wafer-level lens 110 to form an image on image sensor 170. Image sensor 170 captures the image formed thereon by imaging objective 160.

Wafer-level lens 110 includes a lens element 112. Lens element 112 is molded on a trenched substrate 114 with trenches 116. Trenched substrate 114 is capable of at least partially transmitting light in a wavelength range of interest, such as light in the visible wavelength range. Trenched substrate is made of glass or an optical plastic, for example. In the molding process, excess lens material is accommodated by trenches 116. As a result, wafer-level lens 110 does not have the yard characteristic of conventional wafer-level lenses. Although depicted in FIG. 1 as being completely filled by excess lens material, trenches 116 may be only partially filled by excess lens material, without departing from the scope hereof.

Camera module 100 implements wafer-level lens 110 together with another unit 130. Unit 130 is, for example, another wafer-level lens. Alternatively, unit 130 is image sensor 170. Wafer-level lens 110 is coupled to unit 130 and spaced therefrom using a spacer 120. Spacer 120 is bonded to trenched substrate 114. Spacer 120 is disposed on trenched substrate 114 such that a portion of spacer 120 is located on top of trenches 116. This allows for positioning spacer 120 very close to lens element 112.

The number of wafer-level lenses 110 that may be produced from one lens wafer, is at least partly determined by the required distance between lens elements 112. This distance, in turn, is determined at least in part by the area required to accommodate spacer 120.

Figure 2:
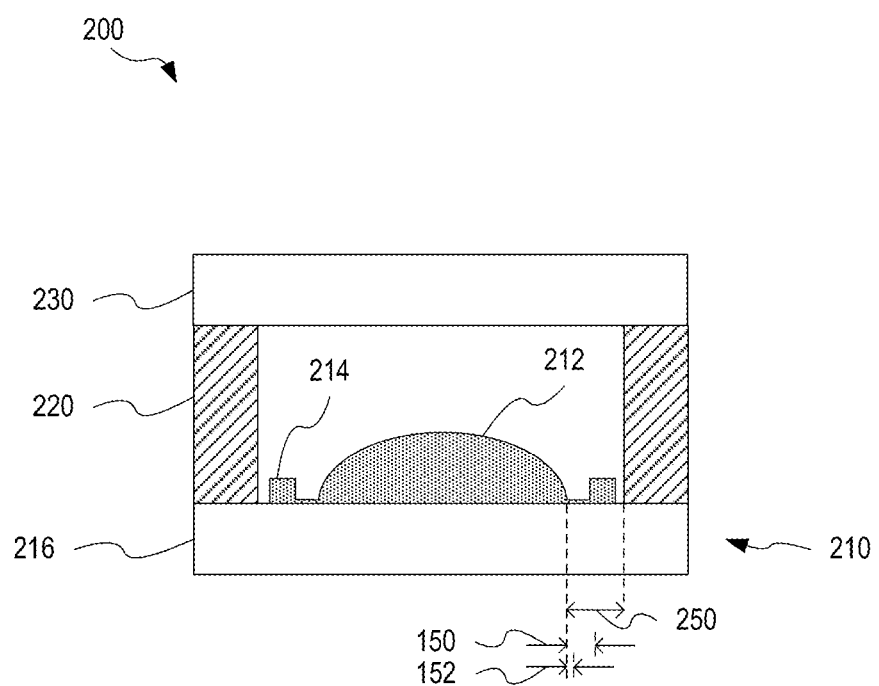
FIG. 2 shows a prior art wafer-level lens assembly based upon a prior art wafer-level lens.

FIG. 2 shows a prior art wafer-level lens assembly 200 based upon a prior art wafer-level lens 210. Prior art wafer-level lens 210 includes a lens element 212, and associated yard 214, molded on a substrate 216. Prior art wafer-level lens assembly 200 further includes another unit 230 such as another wafer-level lens or an image sensor. Unit 230 is coupled to substrate 216 of prior art wafer-level lens 210 using a spacer 220.

Referring again to FIG. 1, distance 150 indicates radial separation between lens element 112 and spacer 120. Distance 150 is less than distance 152. Distance 152 indicates the maximum radial extent of trench 116, measured from lens element 112. In one embodiment, distance 150 is less than half that of distance 152. In another embodiment, distance 150 is less than 10% of distance 152. In yet another embodiment, distance 150 is substantially zero. In a further embodiment, distance 150 is defined by the tolerance associated with positioning of spacer 120 on trenched substrate 114.

For comparison, distances 150 and 152 are superimposed on prior art wafer-level lens assembly 200 of FIG. 2. In prior art wafer-level lens assembly 200, the radial separation between lens element 212 and spacer 220 is distance 250. Due to the presence of yard 214, spacer 220 must be placed on substrate 216 outside yard 214. Therefore, distance 250 is significantly greater than distance 150. Even in a best-case scenario, wherein the maximum radial extent of yard 214 away from lens element 212 is similar to the maximum radial extent of trench 116 away from lens element 112, distance 250 is greater than distance 150. In embodiments where distance 150 is much less than distance 152, for example less than half of distance 152, distance 150 is significantly less than the smallest possible distance 250.

Figure 3:
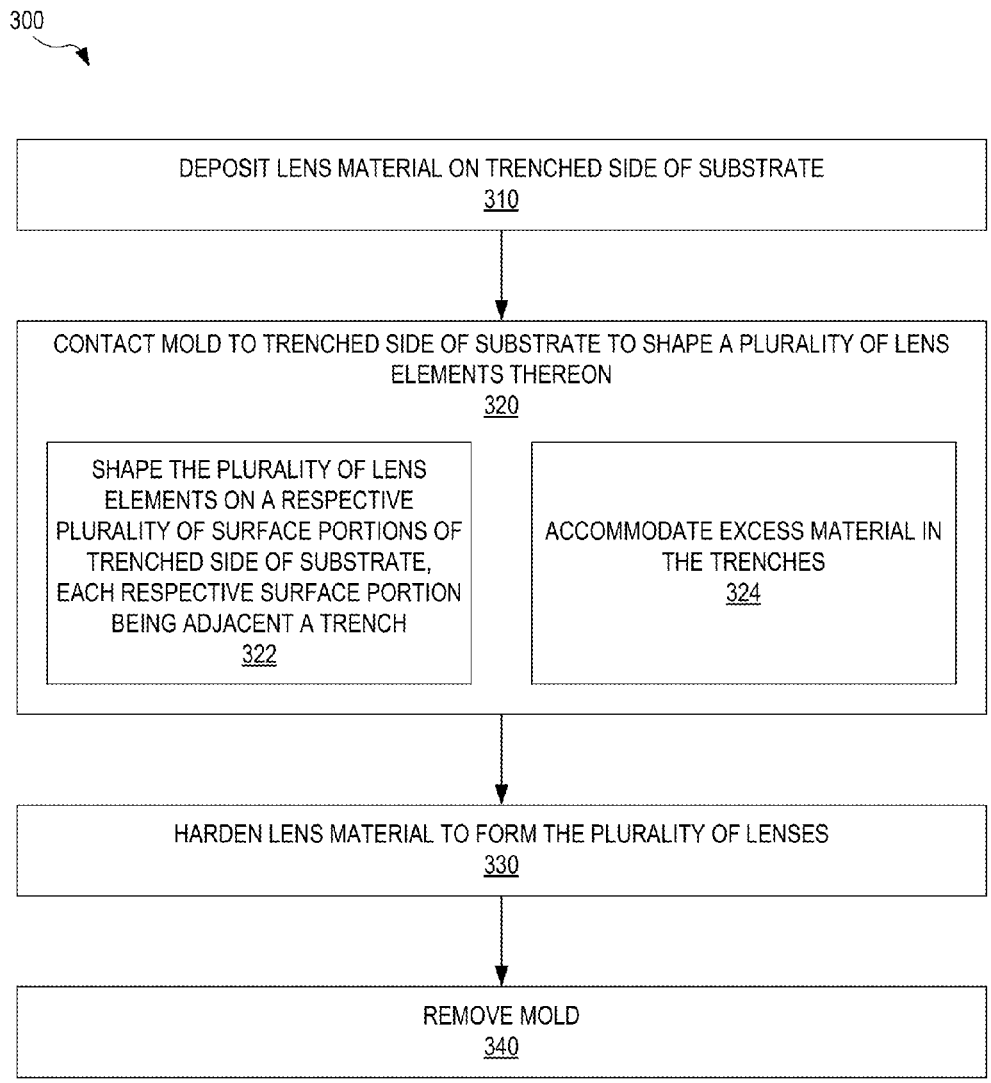
FIG. 3 illustrates a trenched-substrate based method for manufacturing a lens wafer, according to an embodiment.
Figure 4A:
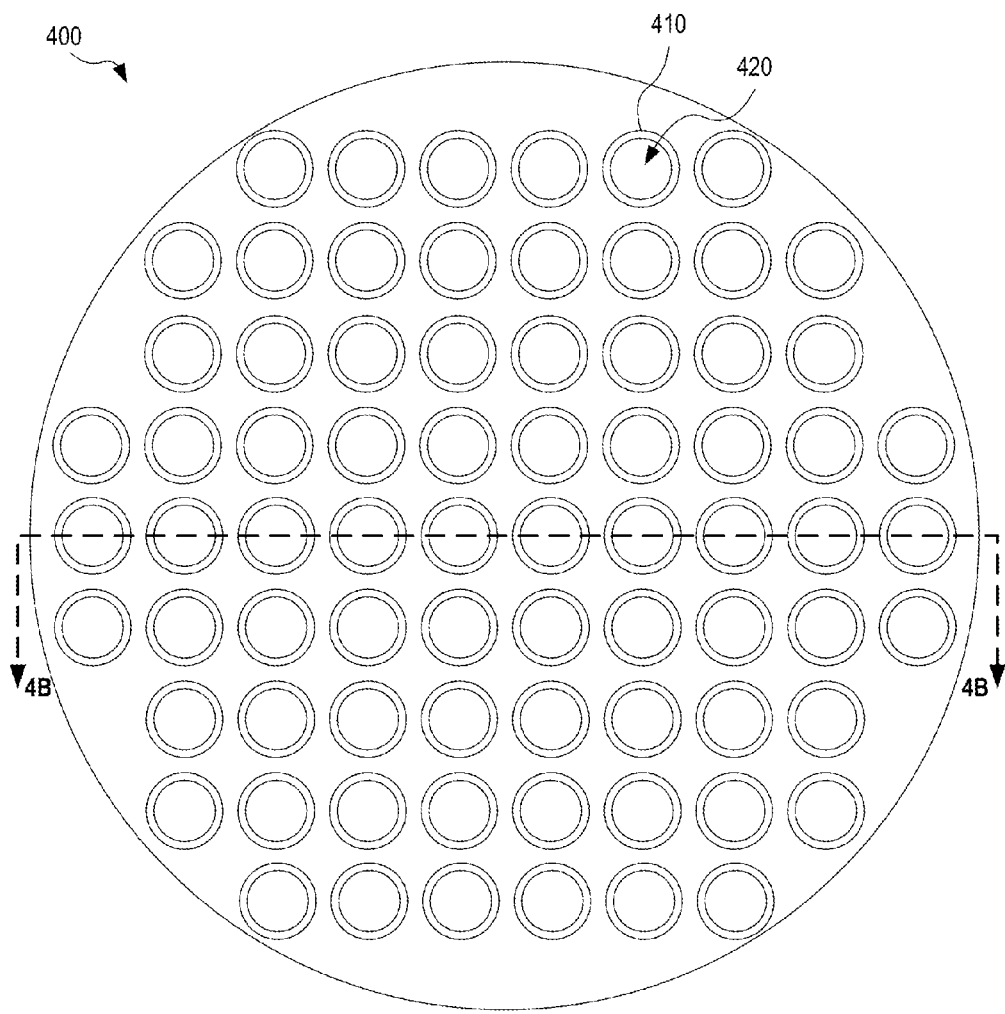
FIGS. 4A and 4B show, in top plan view and cross-sectional side view, respectively, a trenched substrate used by the method of FIG. 3, according to an embodiment.
Figure 4B:
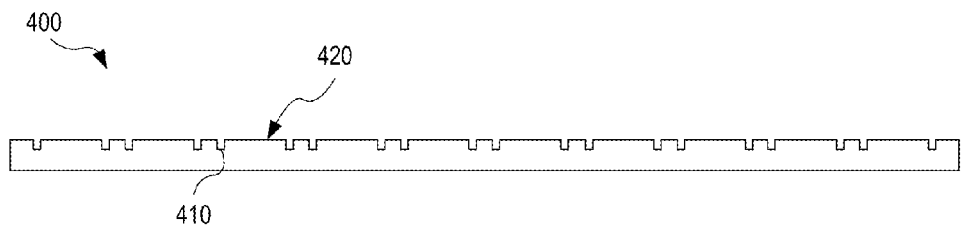
Figure 5:
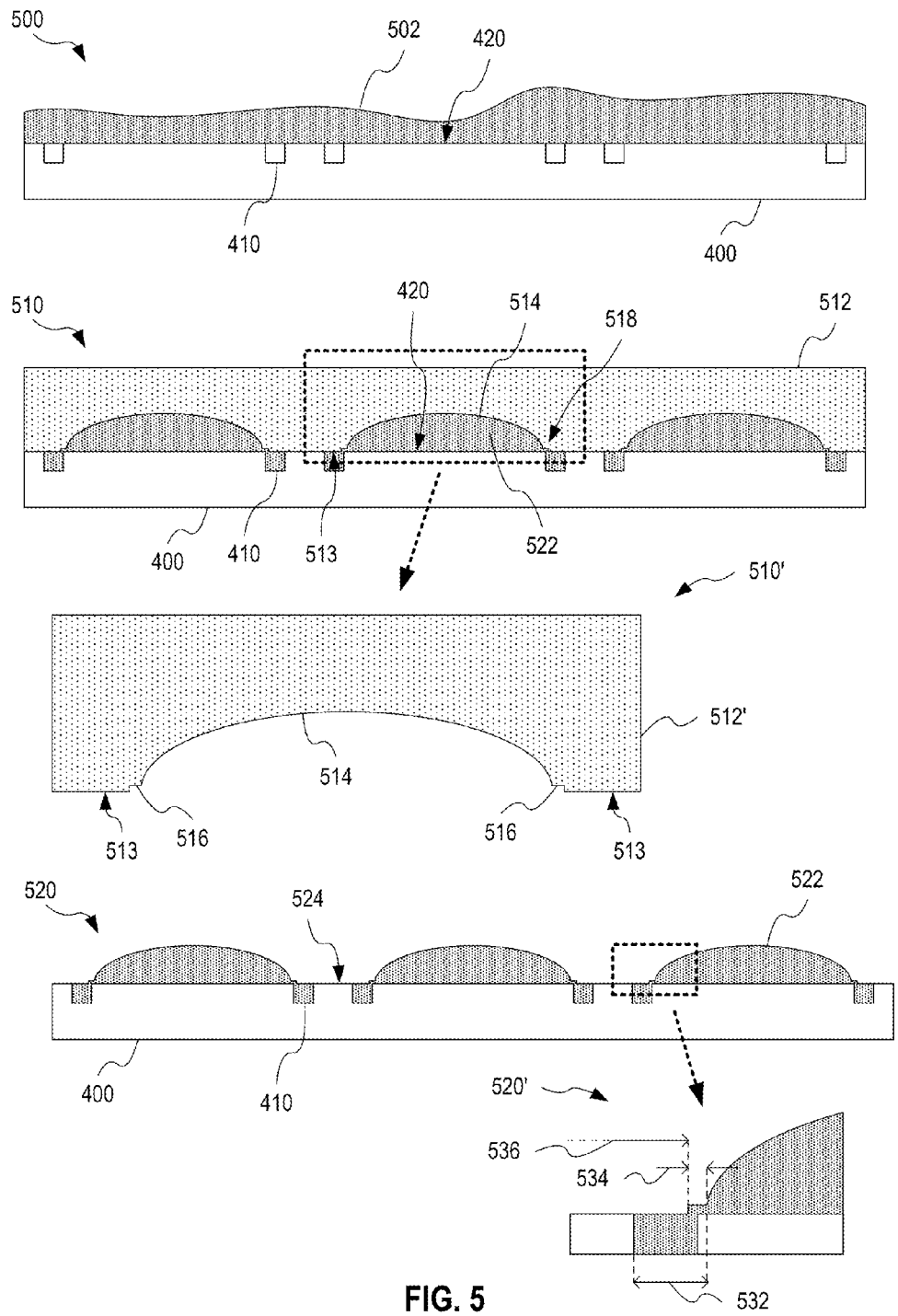
FIG. 5 schematically illustrates certain steps of the method of FIG. 3, as well as a trenched-substrate based lens wafer manufactured according to the method of FIG. 3, according to an embodiment.

FIG. 3 illustrates one exemplary trenched-substrate based method 300 for manufacturing a lens wafer. Method 300 is, for example, used to manufacture a lens wafer, from which trenched-substrate based wafer-level lens 110 (FIG. 1) is singulated. FIGS. 4A and 4B show, in top plan view and cross-sectional side view, respectively, a trenched substrate 400 used by method 300. FIG. 4A shows trenched substrate 400 in top plan view, while FIG. 4B shows trenched substrate 400 in cross-sectional side view, wherein the cross section is taken along line 4B-4B in FIG. 4A. FIG. 5 schematically illustrates, by example in diagrams 500 and 510, certain steps of method 300, as well as one exemplary trenched-substrate based lens wafer 520 manufactured according to method 300. FIGS. 3, 4A, 4B, and 5 are best viewed together.

In a step 310, illustrated in diagram 500 of FIG. 5, a lens material 502 is deposited on trenched substrate 400. In an embodiment, lens material 502 is different from material of trenched substrate 400. As shown in FIGS. 4A and 4B, trenched substrate 400 includes a plurality of trenches 410 respectively surrounding a plurality of surface portions 420. Trenched substrate 400 is capable of transmitting light in a wavelength range of interest, such as light in the visible wavelength range. In one embodiment, trenched substrate 400 is a glass substrate. In another embodiment, trenched substrate 400 is composed of optical plastic. For example, trenched substrate 400 is made of a cyclo olephin polymer, polystyrene, acrylic, and/or poly(methyl methacrylate), or other optical plastic known in the art. Trenches 410 may be formed by etching or machining. For example, a substantially planar substrate may be etched or machined to form trenches 410, thus producing trenched substrate 400. Alternatively, trenched substrate 400, including trenches 410, may be produced by molding or casting, without need for a separate step of forming trenches 410.

Surface portions 420 are surface portions of trenched substrate 400, on which lens elements are to be formed in method 300. Inner and outer boundaries of each trench 410 are circular. However, without departing from the scope hereof, the shape of trenches 410 may be different from what is depicted in FIG. 4A. For example, the outer boundary of at least some of trenches 410 may be rectangular. Additionally, individual trenches 410 may overlap and/or be interconnected. Furthermore, trenched substrate 400 may include more or fewer trenches 410 and associated surface portions 420 than shown in FIG. 4A, and/or trenched substrate 400 may be non-circular, without departing from the scope hereof. For clarity of illustration not all trenches 410 and not all surface portions 420 are labeled in FIGS. 4A and 4B.

Diagram 500 shows, in cross-sectional side view, a portion of trenched substrate 400 after deposition thereon of lens material 502 in step 310. Lens material 502 may be deposited on trenched substrate 400 to cover both surface portions 420 and trenches 410, as shown in diagram 500. For example, lens material 502 may substantially covering all of trenched substrate 400 or a central portion thereof. Although not shown in diagram 500, portion of lens material 502 may drop into at least some of trenches 410 during step 310, without departing from the scope hereof. For clarity of illustration not all trenches 410 and not all surface portions 420 are labeled in FIG. 5.

In a step 320, illustrated in diagram 510 of FIG. 5, a mold 512 is contacted to trenched substrate 400 to shape a plurality of lenses on trenched substrate 400. Step 320 includes a step 322 of shaping a plurality of lens elements 522 on a plurality of surface portions 420. For this purpose, mold 512 includes recesses 514. Step 320 further includes a step 324, wherein trenches 410 accommodate excess portions of lens material 502. Each lens element 522 is an embodiment of lens element 112 (FIG. 1). Without departing from the scope hereof, some excess portion of lens material 502 may be displaced to locations outside of mold 512. Although diagram 510 shows trenches 410 as being completely filled with lens material 502, some or all of trenches 410 may be only partly filled with lens material 502, without departing from the scope hereof. For clarity of illustration not all recesses 514 are labeled in FIG. 5.

Diagram 510' is a close-up of a portion of mold 512 associated with one lens element 522 and one associated trench 410. Recess 514 is surrounded by shallow recess 516 outside the clear aperture of lens element 522. In step 320, shallow recess 516 provides a path for lens material 502 to flow to trench 410 from the space between surface portion 420 and recess 514. Shallow recess 516 does not extend over all of trench 410. Instead, a planar surface 513 of mold 512 is placed above a distant portion of trench 410 level with surface portion 420, wherein the distant portion of the trench is a portion of the trench most distant from the associated surface portion 420. Thus, trench overflow 518 (i.e., lens material 502 above trench 410 and/or between trench 410 and the associated lens element 522) is restricted to an area above trench 410, which is less distance from the associated lens element 522 than the maximum extent of trench 410 away from the associated lens element 522. For clarity of illustration not all trench overflow 518 and not all planar surfaces 513 are labeled in FIG. 5.

In an alternate embodiment, step 310 deposits lens material 502 on mold 512, instead of on trenched substrate 400, and step 320 contacts trenched substrate 400 to mold 512. In one example of step 310, lens material 502 is deposited in recesses 514 of mold 512.

In a step 330, lens material 502 is hardened to complete the formation of the plurality of lens elements 522, thus forming trenched-substrate based lens wafer 520. Step 330 may harden lens material 502 by through a heat or time cure of lens material 502. In an embodiment, lens material 502 is an ultraviolet-light-curably epoxy resin, and step 330 includes exposing lens material 502 to ultraviolet light through trenched substrate 400.

The surface of trenched-substrate based lens wafer 520 associated with lens elements 522 includes planar surface portions 524 not occupied by lens material 502. For clarity of illustration not all planar surface portions 524 are labeled in FIG. 5. Each planar surface portions 524 is located between two or more adjacent trenches 410 and extend over at least a portion of each of such trenches 410. This is illustrated further in a close-up 520' of a portion of trenched-substrate based lens wafer 520. Shallow recesses 516 are configured to limit trench overflow to an area of extent 534 away from the associated lens element 522. Extent 534 is less than extent 532 of trench 410 away from the associated lens element 522, such that extent 536 of planar surface portion 524 overlaps with extent 532. Hence, a spacer, such as spacer 120 (FIG. 1), may be placed on planar surface portion 524 and above trench 410.

In a step 340, mold 512 is removed from trenched substrate 400. Step 340 makes trenched-substrate based lens wafer 520 available for further processing.

Figures 6, 7:
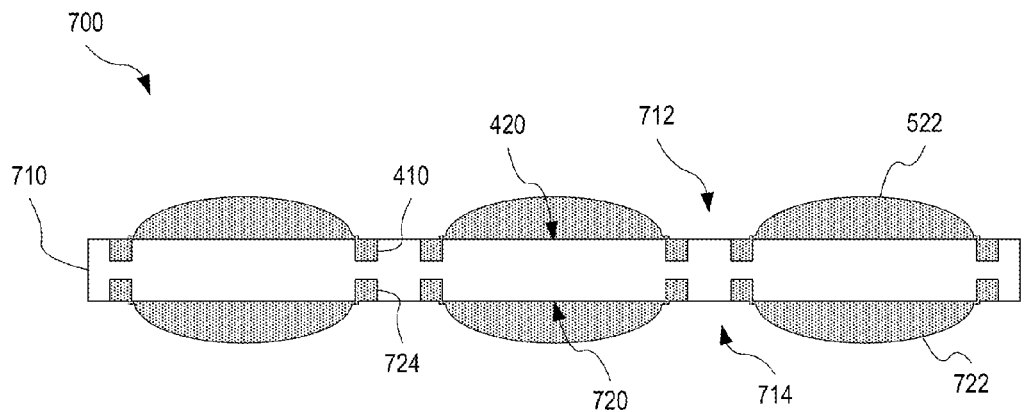
FIG. 6 illustrates a method for manufacturing a double-sided trenched-substrate based lens wafer, according to an embodiment.
FIG. 7 shows a double-sided trenched-substrate based lens wafer manufactured according to the method of FIG. 6, according to an embodiment.

FIG. 6 illustrates one exemplary method 600 for manufacturing a double-sided trenched-substrate based lens wafer. FIG. 7 shows one exemplary double-sided trenched-substrate based lens wafer 700 manufactured according to method 600. FIGS. 6 and 7 are best viewed together.

Method 600 utilizes a trenched substrate 710. Two opposite facing sides 712 and 714 of trenched substrate 710 are trenched. Trenched substrate 710 is an extension of trenched substrate 400 (FIG. 4) with trenches 410 and surface portions 420 on a side 712 of trenched substrate 710, and trenches 724 and surface portions 720 on a side 714 of trenched substrate 710. Sides 712 and 714 are opposite facing. Trenches 724 are similar to trenches 410, although not necessarily identical to trenches 410. Surface portions 720 are similar to surface portions 420, although not necessarily identical to surface portions 420. Surface portions 720 are aligned with surface portions 420, respectively, such that a lens element formed on one surface portion 720 may be optically coupled with a lens element formed on a corresponding surface portion 420.

In a step 610, lens elements 522 are molded on side 420, according to method 300 (FIG. 3). In a step 620, a plurality of lens elements 722 are molded on side 714, according to method 300, to form lens wafer 700. Each lens element 722 is molded on a corresponding surface portion 720, and trenches 724 accommodate excess lens material. Lens element 722 is similar, but not necessarily identical to, lens element 522. For example, the shape and/or material of lens element 722 is different from the shape and/or material, respectively, of lens element 522, in certain embodiments. Lens elements 522 and 722 are positioned to form lens pairs, wherein each lens pair includes one lens element 522 and one lens element 722 in optical communication with each other.

Without departing from the scope hereof, steps 610 and 620 may be performed at least partly in parallel.

Figure 8:
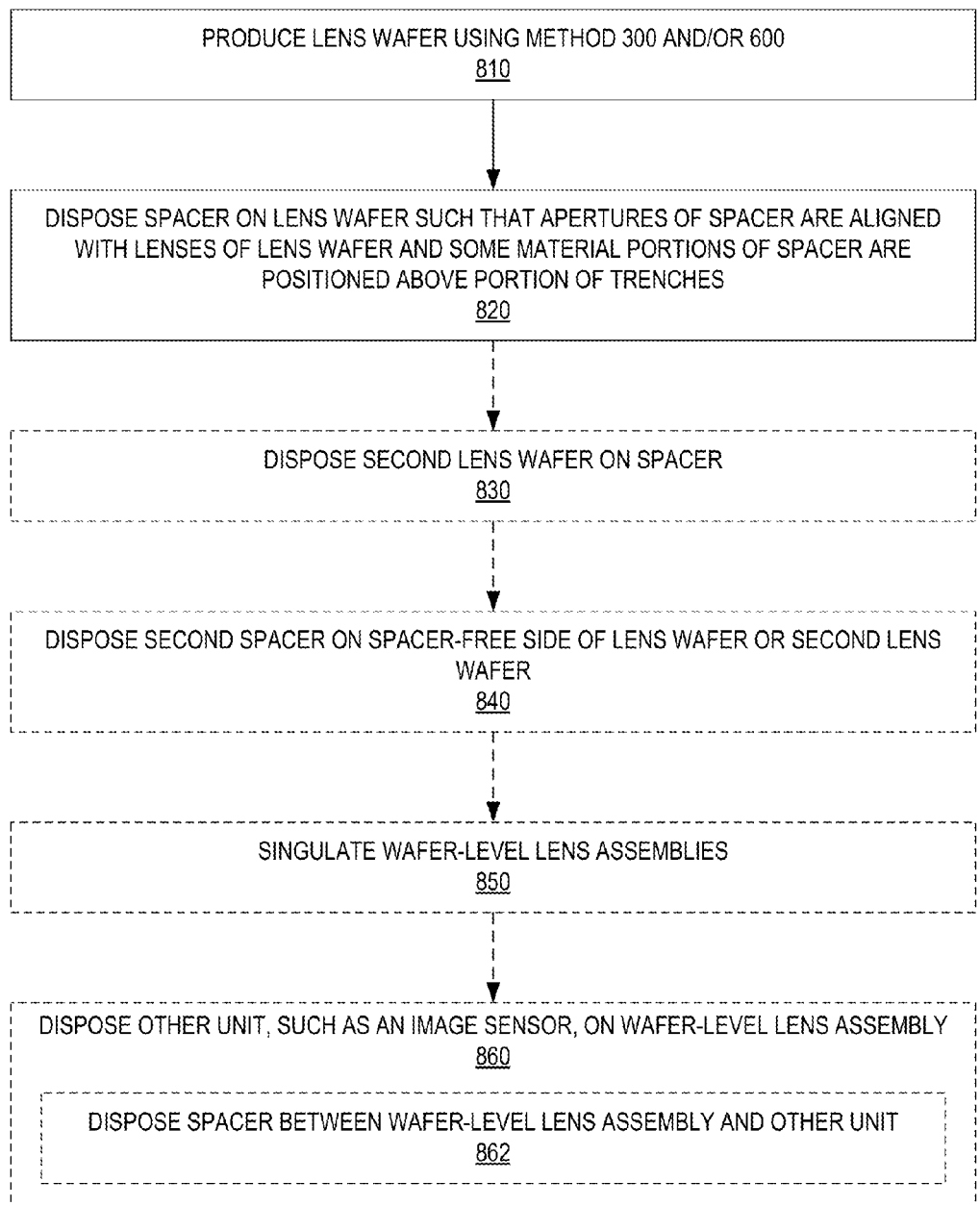
FIG. 8 illustrates a trenched-substrate based method for manufacturing a wafer-level lens assembly, according to embodiments.
Figure 9:
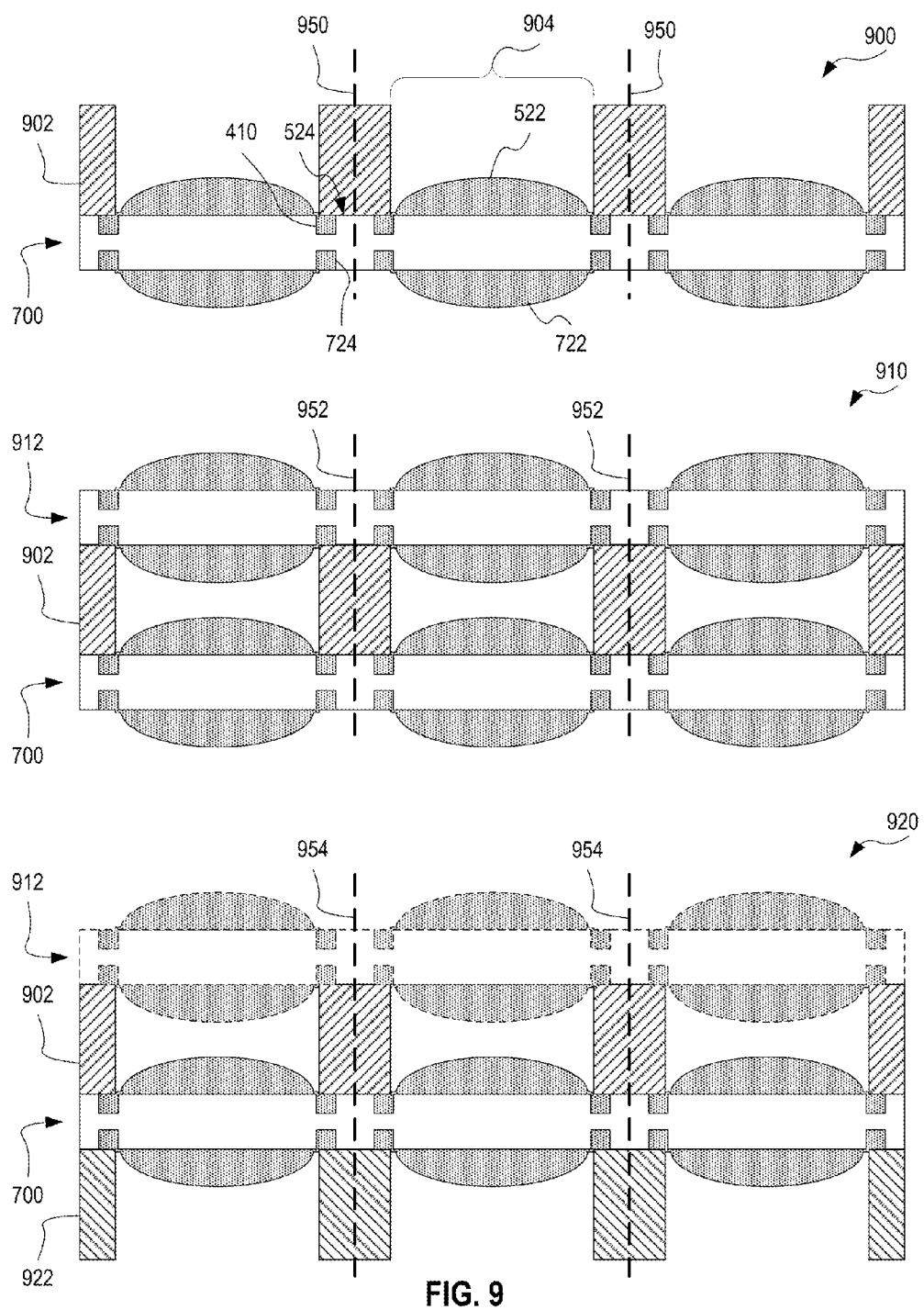
FIG. 9 schematically illustrates certain steps of the method of FIG. 8, according to embodiments.

FIG. 8 illustrates one exemplary trenched-substrate based method 800 for manufacturing a wafer-level lens assembly. FIG. 9 schematically illustrates, by example, certain steps of method 800.

In a step 810, a lens wafer is produced according to method 300 (FIG. 3) and/or method 600 (FIG. 6). In one example, step 810 produces lens wafer 700 (FIG. 7). In the following, method 800 is discussed in the context of lens wafer 700. However, without departing from the scope hereof, step 810 may produce lens wafer 520 (FIG. 5) instead of lens wafer 700.

In a step 820, a spacer 902 is disposed on lens wafer 700 to form a composite wafer 900. Spacer 902 has apertures 904 that are aligned with lens elements 522 to allow light to travel through spacer 902 toward or from lens elements 522. A planar surface of spacer 902 contacts lens wafer 700 in planar surface portions 524 (FIG. 5). Material portions of spacer 902 are located level with planar surface portions 524 above at least a portion of trenches 410. Specifically, for each trench 410, a material portion of spacer 902 is located above at least a portion of trench 410 most distant from the associated lens element 522. This allows for placement of spacer 902 close to lens elements 522, as discussed in reference to spacer 120 and lens element 112 of wafer-level lens 110 (FIG. 1).

In an optional step 830, a second lens wafer 912 is disposed on a planar side of spacer 902 facing away from lens wafer 700. Step 830 thereby forms a composite wafer 910. FIG. 9 shows lens wafer 912 as being similar to lens wafer 700. However, lens wafer 912 may be similar to lens wafer 520, without departing from scope hereof.

In an optional step 840, a second spacer 922 is disposed on the side of lens wafer 700 facing away from spacer 902, with a planar surface of spacer 922 contacting lens wafer 700. Step 840 thus forms a composite wafer 920. In an embodiment of method 800 including step 830, composite wafer 920 includes lens wafer 912. Spacer 922 is similar to spacer 902, and step 840 is performed in a fashion similar to step 820. Steps 830 and 840 may be repeated any number of times to stack additional lens wafers with spacers. Without departing from the scope hereof, step 840 instead disposes spacer 922 on the side of lens wafer 912 facing away from spacer 902.

An optional step 850 singulates wafer-level assemblies from composite wafer 900, 910, and/or 920.

In another optional step 860, another unit, such as unit 130 (FIG. 1), is disposed on one or more wafer-level assemblies formed in step 850. In one embodiment, the other unit is disposed directly on the wafer-level lens assembly, for example on a planar surface of a spacer of the wafer-level assembly. In another embodiment, step 860 includes a step 862 of disposing a spacer between the wafer-level lens assembly and the other unit, for at least one wafer-level lens assembly. In one example of step 860, the wafer-level lens assembly forms an imaging objective, such as imaging objective 160, and the other unit is an image sensor, such that step 860 produces one or more camera modules such as one or more camera modules 100. In another example of step 860, the other unit is a second wafer-level lens, or a stacked assembly of wafer-level lenses, and step 860 optically couples the wafer-level lens assembly with the second wafer-level lens or the stacked assembly of wafer-level lenses.

Figure 10:
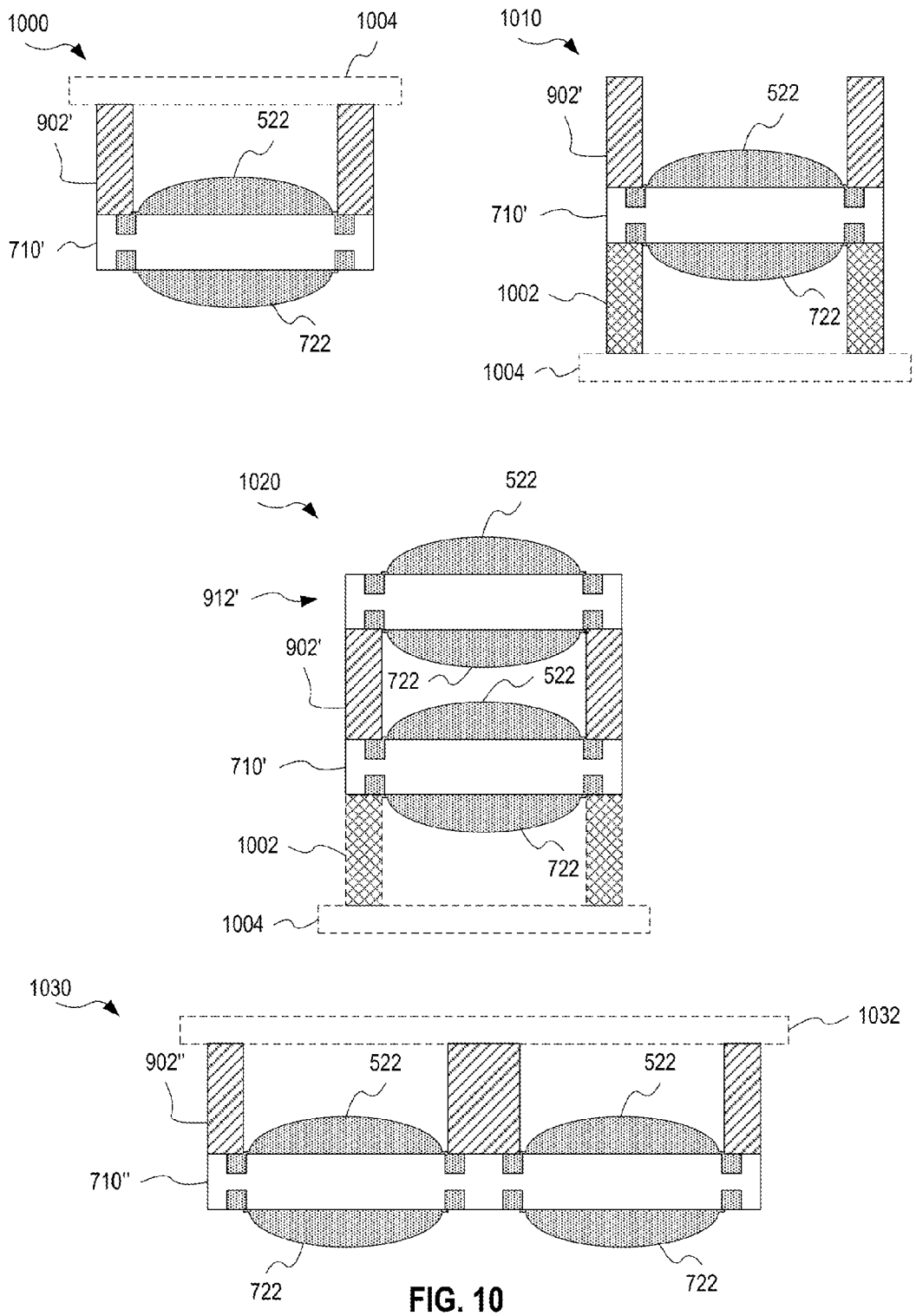
FIG. 10 illustrates wafer-level lens assemblies manufactured using the method of FIG. 8, according to embodiments.

FIG. 10 illustrates exemplary trenched-substrate based wafer-level lens assemblies 1000, 1010, 1020, 1030, and 1040 manufactured using method 800 (FIG. 8).

Wafer-level lens assembly 1000 includes a wafer-level lens formed by portion 710' of trenched substrate 710, lens element 522, and lens element 722. In one embodiment, wafer-level lens assembly 1000 further includes a spacer 902' which is a portion of spacer 902. Spacer 902' is disposed on portion 710'. This embodiment of wafer-level assembly 1000 is manufactured by performing steps 810, 820, and 850 of method 800, wherein step 850 includes dicing composite wafer 900 along dicing lines 950 (shown in FIG. 9). In another embodiment, wafer-level lens assembly 1000 additionally includes a unit 1004 disposed on spacer 902'. This embodiment of wafer-level lens assembly 1000 is manufactured by performing steps 810, 820, 850, and 860 of method 800, wherein step 850 includes dicing composite wafer 900 along dicing lines 950. Unit 1004 is, for example, an image sensor that captures an image formed thereon at least in part by the wafer-level lens, in which case this embodiment of wafer-level lens assembly 1000 may be a camera module, such as camera module 100 (FIG. 10).

Wafer-level lens assembly 1010 includes (a) the wafer-level lens formed by portion 710', lens element 522, and lens element 722, (b) spacer 902' disposed on the side of portion 710' associated with lens element 522, and (c) a spacer 1002 disposed on the side of portion 710' associated with lens element 722. Optionally, wafer-level lens assembly 1010 further includes unit 1004. In one embodiment, wafer-level lens assembly 1010 is manufactured by performing steps 810, 820, 840, and 850 of method 800, wherein step 850 includes dicing composite wafer 920 along dicing lines 954 (FIG. 9). In this embodiment, spacer 1002 is a portion of spacer 922. Optionally, step 860 is performed to incorporate unit 1004 into wafer-level lens assembly 1010. In another embodiment, wafer-level lens assembly 1010 is manufactured by performing steps 810, 820, 850, 860, and 862 of method 800, wherein step 850 includes dicing composite wafer 900 along dicing lines 950.

Wafer-level lens assembly 1020 includes (a) the wafer-level lens formed by portion 710', lens element 522, and lens element 722, (b) spacer 902' disposed on the side of portion 710' associated with lens element 522, and (c) a wafer-level lens formed by portion 912' of lens wafer 912 including one lens element 522 and one lens element 722. In one embodiment, wafer-level lens assembly 1020 is manufactured by performing steps 810, 820, 830, and 850 of method 800, wherein step 850 includes dicing composite wafer 910 along dicing lines 952 (FIG. 9). In another embodiment, wafer-level lens assembly 1020 further includes spacer 1002. This embodiment of wafer-level lens assembly 1020 is manufactured by performing steps 810, 820, 830, 840, and 850 of method 800, wherein step 850 includes dicing composite wafer 920 (including lens wafer 912) along dicing lines 954 (FIG. 9). In yet another embodiment, wafer-level lens assembly 1020 further includes unit 1004. This embodiment of wafer-level lens assembly 1020 is manufactured by (a) performing steps 810, 820, 830, 840, 850, and 860 of method 800, wherein step 850 includes dicing composite wafer 920 (including lens wafer 912) along dicing lines 954, or (b) performing steps 810, 820, 830, 850, 860, and 862 of method 800, wherein step 850 includes dicing composite wafer 910 (including lens wafer 912) along dicing lines 952.

Each of wafer-level lens assemblies 1000, 1010, and 1020 may be extended to array wafer-level lens assemblies by using only a true subset of dicing lines 950, 952, or 954. Array wafer-level lens assembly 1030 is an extension of wafer-level lens assembly 1000, wherein step 850 utilizes only a true subset of dicing lines 950, and wherein optional unit 1004 is replaced by an optional unit 1032 that is optically coupled with multiple wafer-level lenses of wafer-level lens assembly 1030. Wafer-level lens assembly 1030 thus includes an array of wafer-level lenses, each including a lens element 522 and a lens element 722. The array of wafer-level lenses share a portion 710" of trenched substrate 710. In one embodiment, unit 1032 is an image sensor array, and wafer-level lens assembly 1030 is an array camera module. Although FIG. 10 shows wafer-level lens assembly 1030 as having only two wafer-level lenses, wafer-level lens assembly 1030 may include more than two wafer-level lenses. For example, wafer-level lens assembly 1030 may include three wafer-level lenses arranged in 1×3 array, or four wafer-level lenses arranged in a 2×2 array.

Without departing from the scope hereof, each of wafer-level lens assemblies 1000, 1010, 1020, and 1030 may be based upon single-sided wafer-level lenses. As compared to the illustrations in FIG. 10, such single-sided wafer-level lenses may (a) include lens elements 522 without lens elements 722, or (b) include lens elements 722 without lens elements 522. This corresponds to performing method 800 using lens wafers of type similar to lens wafer 520. Furthermore, wafer-level lens assembly 1020 may include a single-sided wafer-level lens and a double-sided wafer-level lens.

Combinations of Features

Features described above as well as those claimed below may be combined in various ways without departing from the scope hereof. For example, it will be appreciated that aspects of one trenched-substrate based lens manufacturing method, or associated lens system, described herein may incorporate or swap features of another trenched-substrate based lens manufacturing method, or associated lens system, described herein. The following examples illustrate possible, non-limiting combinations of embodiments described above. It should be clear that many other changes and modifications may be made to the methods and device herein without departing from the spirit and scope of this invention:

(A1) A trenched-substrate based lens manufacturing method may include (a) depositing lens material on a first side of a substrate, wherein the first side of the substrate has a plurality of trenches, (b) shaping a plurality of lens elements, from the lens material and on a respective plurality of surface portions of the first side, by contacting a mold to the first side, wherein each of the surface portions are adjacent a respective one of the trenches, and (c) accommodating an excess portion of the lens material in the trenches.

(A2) In the method denoted as (A1), the mold may include a first mold surface facing the substrate when the mold is contacted to the substrate, wherein the first mold surface is planar with a plurality of recesses for respectively shaping (a) the plurality of lens elements and (b) a plurality of flow paths from the surface portions to the trenches.

(A3) In each of the methods denoted as (A1) and (A2), the step of shaping may further include, for each one of the surface portions, placing a surface of the mold over a distant portion of a respective one of the trenches and level with the first side, to avoid trench overflow at the distant portion, wherein the distant portion is a portion of the trench that is most distant from the surface portion.

(A4) The method denoted as (A3) may further include, in the step of placing and for each one of the surface portions, limiting trench overflow to an overflow region having extent of away from the surface portion less than extent of the respective one of the trenches away from the surface portion.

(A5) Each of the methods denoted as (A1) through (A4) may further include (a) disposing a planar spacer wafer on the first side, wherein the planar spacer wafer has apertures, (b) aligning the apertures with the lens elements, and (c) positioning a planar material portion of the planar spacer wafer above at least a portion of the trenches.

(A6) In the method denoted as (A5), the step of positioning may include positioning the planar material portion over distant portions of the trenches.

(A7) In each of the methods denoted as (A5) and (A6), the step of disposing may include contacting a first planar side of the planar spacer wafer to the substrate, and the method may further include disposing a lens wafer on a second planar side of the planar spacer wafer, wherein the second planar side faces away from the first planar side.

(A8) The method denoted as (A7) may further include producing the lens wafer using the steps of depositing, shaping, and accommodating.

(A9) Each of the methods denoted as (A1) through (A8) may further include dicing the substrate to form a plurality of wafer-level lens assemblies, wherein each of the wafer-level lens assemblies has at least one of the lens elements.

(A10) The method denoted as (A9) may further include, for at least one of the wafer-level lens assemblies, disposing a spacer on the first side, wherein the spacer has a first planar surface facing the first side and a portion of the first planar surface is disposed over the least a portion of one of the trenches associated with the at least one of the lens elements.

(A11) The method denoted as (A10) may further include disposing a second lens assembly on a second planar surface of the spacer, wherein the second planar surface faces away from the first planar surface.

(A12) The method denoted as (A10) may further include disposing, on a second planar surface of the spacer, an image sensor for capturing an image of light received from a corresponding one of the lens elements.

(A13) In each of the methods denoted as (A1) through (A12), the substrate may further include a second side facing away from the first side, wherein the second side including a plurality of second trenches.

(A14) The method denoted as (A13) may include (a) depositing second lens material on the second side, and (b) shaping a plurality of second lens elements, from the second lens material and on a respective plurality of second surface portions of the second side, by contacting a mold to the second side, wherein each of the second surface portions is adjacent a respective one of the second trenches, and (c) accommodating an excess portion of the second lens material in the second trenches.

(A15) In the method denoted as (A14), the plurality of second lens elements may be aligned with the plurality of lens elements, respectively.

(A16) Each of the methods denoted as (A14) and (A15) may further include dicing the substrate to form a plurality of wafer-level lens assemblies each including one of the lens elements and one of the second lens elements.

(A17) The method denoted as (A16) may further include, for at least one of the wafer-level lens assemblies, disposing a spacer on the first side, wherein the spacer has a first planar surface facing the first side and a portion of the first planar surface is disposed over the least a portion of one of the trenches associated with the at least one of the lens elements.

(A18) The method denoted as (A17) may further include disposing, on a second planar surface of the spacer facing away from the first planar surface, an image sensor for capturing an image of light transmitted by a corresponding one of the second lens elements and a corresponding one of the lens elements.

(B1) A lens system may include (a) a substrate with a planar surface and a trench embedded in the planar surface, and (b) a lens element molded on the planar surface adjacent to the trench.

(B2) In the lens system denoted as (B1), the lens element may be of a first material, and the lens system may further have the first material in the trench.

(B3) In the lens system denoted as (B2), the first material may be different from the material of the substrate.

(B4) Each of the lens systems denoted as (B2) and (B3) of claim 17 may further have the first material on the planar surface between the lens element and the trench.

(B5) Each of the lens systems denoted as (B1) through (B4) may further include a spacer with a planar spacer surface, wherein the spacer is disposed on the substrate with a first portion of the planar spacer surface contacting the planar surface and a second portion of the planar spacer surface being located above a portion of the trench.

(B6) Each of the lens systems denoted as (B1) through (B5) may be manufactured using each of at least one of the methods denoted as (A1) through (A18).

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present system and method, which, as a matter of language, might be said to fall therebetween.

What is claimed is:

1. A trenched-substrate based lens manufacturing method, comprising:
   depositing lens material on a first side of a substrate, the first side of the substrate having a plurality of trenches;
   shaping a plurality of lens elements, from the lens material and on a respective plurality of planar surface portions of the first side, by contacting a mold to the first side, each of the planar surface portions spanning surface of the first side enclosed by a respective one of the trenches; and
   accommodating an excess portion of the lens material in the trenches.

2. The method of claim 1, in the step of shaping, the mold including a first mold surface facing the substrate when the mold is contacted to the substrate, the first mold surface being planar with a plurality of recesses for respectively shaping (a) the plurality of lens elements and (b) a plurality of flow paths from the planar surface portions to the trenches.

3. The method of claim 1, the step of shaping further comprising for each one of the planar surface portions:
   placing a surface of the mold over a distant portion of a respective one of the trenches and level with the first side, to avoid trench overflow at the distant portion, the distant portion being most distant from the surface portion.

4. The method of claim 3, further comprising, in the step of placing and for each one of the planar surface portions, limiting trench overflow to an overflow region, extent of the overflow region away from the surface portion being less than extent of the respective one of the trenches away from the surface portion.

5. The method of claim 1, further comprising:
   disposing a planar spacer wafer on the first side, the planar spacer wafer having apertures;
   aligning the apertures with the lens elements; and
   positioning a planar material portion of the planar spacer wafer above at least a portion of the trenches.

6. The method of claim 5, the step of positioning comprising:
   positioning the planar material portion over distant portions of the trenches.

7. The method of claim 5,
the step of disposing comprising contacting a first planar side of the planar spacer wafer to the substrate; and
the method further comprising disposing a lens wafer on a second planar side of the planar spacer wafer, the second planar side facing away from the first planar side.

8. The method of claim 7, further comprising:
producing the lens wafer using the steps of depositing, shaping, and accommodating.

9. The method of claim 1, further comprising:
dicing the substrate to form a plurality of wafer-level lens assemblies, each of the wafer-level lens assemblies including at least one of the lens elements; and
for at least one of the wafer-level lens assemblies, disposing a spacer on the first side, the spacer having a first planar surface facing the first side, a portion of the first planar surface being disposed over the least a portion of one of the trenches associated with the at least one of the lens elements.

10. The method of claim 9, further comprising:
disposing a second lens assembly on a second planar surface of the spacer, the second planar surface facing away from the first planar surface.

11. The method of claim 9, further comprising:
disposing, on a second planar surface of the spacer, an image sensor for capturing an image of light received from a corresponding one of the lens elements.

12. The method of claim 1, the substrate further including a second side facing away from the first side, the second side including a plurality of second trenches, the method comprising:
depositing second lens material on the second side;
shaping a plurality of second lens elements, from the second lens material and on a respective plurality of second planar surface portions of the second side, by contacting a mold to the second side, each of the second planar surface portions spanning surface of the second side enclosed by a respective one of the second trenches; and
accommodating an excess portion of the second lens material in the second trenches.

13. The method of claim 12, the plurality of second lens elements being aligned with the plurality of lens elements, respectively.

14. The method of claim 12, further comprising:
dicing the substrate to form a plurality of wafer-level lens assemblies, each one of the wafer-level lens assemblies including one of the lens elements and one of the second lens elements; and
for at least one of the wafer-level lens assemblies, disposing a spacer on the first side, the spacer having a first planar surface facing the first side, a portion of the first planar surface being disposed over the least a portion of one of the trenches associated with the at least one of the lens elements.

15. The method of claim 14,
the method further comprising disposing, on a second planar surface of the spacer facing away from the first planar surface, an image sensor for capturing an image of light transmitted by a corresponding one of the second lens elements and a corresponding one of the lens elements.

16. A lens system comprising:
a substrate including a planar surface and a trench embedded in the planar surface such that at least a portion of the planar surface spans surface area enclosed by the trench; and
a lens element molded on the at least a portion of the planar surface enclosed by the trench.

17. The lens system of claim 16,
the lens element being of a first material; and
the lens system further comprising the first material in the trench.

18. The lens system of claim 17, the first material being different from material of the substrate.

19. The lens system of claim 17, further comprising the first material on the planar surface between the lens element and the trench.

20. The lens system of claim 16, further comprising a spacer with a planar spacer surface, the spacer being disposed on the substrate with a first portion of the planar spacer surface contacting the planar surface and a second portion of the planar spacer surface being located above a portion of the trench.

* * * * *